(12) United States Patent
Shutty et al.

(10) Patent No.: US 8,935,024 B2
(45) Date of Patent: Jan. 13, 2015

(54) BOOST ASSIST SYSTEM

(75) Inventors: John Shutty, Clarkston, MI (US); David B. Roth, Groton, NY (US); Volker Joergl, Breitenfurt (AT); Robert Czarnowski, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1307 days.

(21) Appl. No.: 12/673,286

(22) PCT Filed: Aug. 15, 2008

(86) PCT No.: PCT/US2008/073274
§ 371 (c)(1),
(2), (4) Date: Jul. 19, 2011

(87) PCT Pub. No.: WO2009/026134
PCT Pub. Date: Feb. 26, 2009

(65) Prior Publication Data
US 2011/0276204 A1    Nov. 10, 2011

Related U.S. Application Data

(60) Provisional application No. 60/956,488, filed on Aug. 17, 2007.

(51) Int. Cl.
*F02D 23/00* (2006.01)
*F02B 33/44* (2006.01)
(Continued)

(52) U.S. Cl.
CPC .............. *F02B 33/44* (2013.01); *F02B 21/00* (2013.01); *F02B 37/04* (2013.01); *F02B 39/08* (2013.01); *F02D 41/0007* (2013.01); *F02B 29/0406* (2013.01); *Y02T 10/144* (2013.01)

USPC ............. 701/22; 701/36; 701/99; 701/101; 701/102; 60/597; 60/598; 60/605.1

(58) Field of Classification Search
CPC .......... F02B 33/00; F02B 33/44; F02B 37/00; F02D 23/00; F02D 41/0002; F02D 41/0007
See application file for complete search history.

(56) References Cited

U.S. PATENT DOCUMENTS 3,673,796 A * 7/1972 Weick et al. .................... 60/611
4,083,188 A * 4/1978 Kumm .......................... 60/605.1
(Continued)

FOREIGN PATENT DOCUMENTS

WO    2005113961 A1    1/2005
WO    2009026134 A2    2/2009

OTHER PUBLICATIONS

Chinese Office Action dated Aug. 1, 2012; Application SN: 200880101580.6; Applicant: BorgWarner, Inc; 8 pages.
(Continued)

Primary Examiner — Jonathan M. Dager
(74) Attorney, Agent, or Firm — BrooksGroup

(57) ABSTRACT

According to one implementation of an engine system, a power device is selectively actuated to provide energy to a storage device. Energy from the storage device is selectively provided to a boost assist device to supplement the normal energy supply to a boost device and enable an increased power output of the engine in at least certain engine or vehicle operating conditions. In one form, the power device may be a source of electrical energy and the storage device is capable of storing an electrical charge. In another form, the power device is a fluid pump and the storage device is capable of storing pressurized fluid. Various methods may be employed to control operation of the power device and energy storage in the storage device.

39 Claims, 4 Drawing Sheets

(51) Int. Cl.
*F02B 21/00* (2006.01)
*F02B 37/04* (2006.01)
*F02B 39/08* (2006.01)
*F02D 41/00* (2006.01)
*F02B 29/04* (2006.01)

(56) References Cited

U.S. PATENT DOCUMENTS

| | | | | |
|---|---|---|---|---|
| 4,481,773 | A * | 11/1984 | Sugito et al. | 60/606 |
| 5,064,423 | A * | 11/1991 | Lorenz et al. | 60/611 |
| 5,299,547 | A * | 4/1994 | Michimasa | 123/559.1 |
| H1466 | H * | 8/1995 | Stapf | 123/585 |
| 5,819,538 | A * | 10/1998 | Lawson, Jr. | 60/611 |
| 6,138,616 | A * | 10/2000 | Svensson | 123/26 |
| 6,209,324 | B1 * | 4/2001 | Daudel et al. | 60/605.2 |
| 6,305,169 | B1 * | 10/2001 | Mallof | 60/608 |
| 6,484,673 | B1 * | 11/2002 | Davis et al. | 123/26 |
| 6,826,910 | B1 * | 12/2004 | Easton | 60/597 |
| 6,938,420 | B2 * | 9/2005 | Kawamura et al. | 60/612 |
| 6,971,367 | B2 * | 12/2005 | Satou et al. | 123/350 |
| 7,076,954 | B1 * | 7/2006 | Sopko et al. | 60/607 |
| 7,640,744 | B2 * | 1/2010 | Rollinger et al. | 60/605.1 |
| 7,654,085 | B2 * | 2/2010 | Dumas et al. | 60/606 |
| 7,762,069 | B2 * | 7/2010 | Gerum | 60/611 |
| 7,854,118 | B2 * | 12/2010 | Vetrovec | 60/605.1 |
| 7,926,271 | B2 * | 4/2011 | Nemeth et al. | 60/605.1 |
| 7,958,864 | B2 * | 6/2011 | Sturman | 123/321 |
| 7,975,666 | B2 * | 7/2011 | Gokhale et al. | 123/179.18 |
| 8,069,665 | B2 * | 12/2011 | Pursifull et al. | 60/611 |
| 8,371,118 | B2 * | 2/2013 | Ulrey et al. | 60/598 |
| 8,371,276 | B2 * | 2/2013 | Pursifull et al. | 123/564 |
| 8,434,305 | B2 * | 5/2013 | Donkin et al. | 60/611 |
| 8,528,332 | B2 * | 9/2013 | Pursifull et al. | 60/611 |
| 8,534,065 | B2 * | 9/2013 | Pursifull et al. | 60/611 |
| 8,726,891 | B2 * | 5/2014 | Pursifull et al. | 123/559.1 |
| 8,820,056 | B2 * | 9/2014 | VanDyne et al. | 60/295 |
| 2003/0005695 | A1 * | 1/2003 | Allen et al. | 60/608 |
| 2003/0015185 | A1 * | 1/2003 | Dutart | 123/585 |
| 2003/0199361 | A1 * | 10/2003 | Tabata | 477/181 |
| 2004/0139796 | A1 * | 7/2004 | Beyer et al. | 73/117.3 |
| 2004/0259682 | A1 * | 12/2004 | Tabata et al. | 477/102 |
| 2005/0155348 | A1 * | 7/2005 | Inoue | 60/602 |
| 2005/0199231 | A1 * | 9/2005 | Heider | 123/585 |
| 2006/0123783 | A1 * | 6/2006 | Philippe | 60/607 |
| 2006/0168958 | A1 * | 8/2006 | Vetrovec | 60/599 |
| 2006/0196183 | A1 | 9/2006 | Isogai | |
| 2006/0260304 | A1 * | 11/2006 | Ishiwatari | 60/599 |
| 2007/0119169 | A1 * | 5/2007 | Berger et al. | 60/600 |
| 2007/0125346 | A1 * | 6/2007 | Vetrovec | 123/563 |
| 2007/0246006 | A1 * | 10/2007 | Ma et al. | 123/308 |
| 2007/0283939 | A1 * | 12/2007 | Berger et al. | 123/585 |
| 2008/0066467 | A1 * | 3/2008 | Nemeth et al. | 60/606 |
| 2008/0072595 | A1 * | 3/2008 | Nemeth et al. | 60/605.1 |
| 2008/0133110 | A1 * | 6/2008 | Vetrovec | 701/103 |
| 2009/0016911 | A1 * | 1/2009 | Noelle | 417/407 |
| 2009/0018756 | A1 * | 1/2009 | Storhok et al. | 701/105 |
| 2009/0025386 | A1 * | 1/2009 | Rumsby | 60/607 |
| 2009/0044788 | A1 * | 2/2009 | Shutty et al. | 123/559.1 |
| 2009/0062059 | A1 * | 3/2009 | Shutty | 477/2 |
| 2009/0178407 | A1 * | 7/2009 | Joergl et al. | 60/602 |
| 2009/0320466 | A1 * | 12/2009 | Vetrovec | 60/602 |
| 2010/0115944 | A1 * | 5/2010 | Shutty et al. | 60/602 |
| 2010/0139267 | A1 * | 6/2010 | Schliesche et al. | 60/602 |
| 2010/0331143 | A1 * | 12/2010 | Jager et al. | 477/167 |

OTHER PUBLICATIONS

PCT International Search Report and Written Opinion dated Mar. 5, 2009; International Application No. PCT/US2008/073274 filed Aug. 15, 2008, 7 pages.

* cited by examiner

FIG_3

BOOST ASSIST SYSTEM

CROSS-REFERENCE TO RELATED APPLICATIONS

This application claims the benefit of U.S. Provisional Application No. 60/956,488, filed Aug. 17, 2007.

TECHNICAL FIELD

The field to which this disclosure generally relates includes engine systems including a boost assist device.

BACKGROUND

Several technologies are emerging to improve fuel economy, emissions and performance of internal combustion engine powered vehicles. One of these technologies involves the addition of air boost devices, like turbochargers, and air boost assist devices that supplement the turbochargers. Exemplary boost assist devices include hydraulically driven devices, electrically driven devices, belt driven devices and pneumatically driven devices. These devices may be driven directly by the engine, such as with a belt or via a hydraulic pump (which may be driven by the engine), or via an alternator (which is driven by the engine). In any case, the economical use of energy is important due to sizing considerations, fuel economy considerations and performance considerations.

SUMMARY OF EXEMPLARY EMBODIMENTS OF THE INVENTION

According to one implementation of an engine system, a power device is selectively actuated to provide energy to a storage device. Energy from the storage device is selectively provided to a boost assist device to supplement the normal energy supply to a boost device and enable an increased power output of the engine in at least certain engine or vehicle operating conditions. In one form, the power device may be a source of electrical energy and the storage device is capable of storing an electrical charge. In another form, the power device is a fluid pump and the storage device is capable of storing pressurized fluid.

In one implementation, the storage device includes an accumulator that retains a supply of pressurized fluid that is delivered to the boost assist device under at least certain engine or vehicle operating conditions to provide supplemental energy to the boost assist device. A fluid pump may be communicated with the accumulator to deliver pressurized fluid to the accumulator, and a control may selectively actuate the pump under certain operating conditions to ensure a desired supply of pressurized fluid is retained in the accumulator for delivery to the boost device as needed.

In one implementation, the pump is actuated to charge the accumulator whenever the pressure in the accumulator drops below a target value and the engine power is below a threshold value. Then, if additional engine power is demanded, pressurized fluid from the accumulator can be delivered to the boost assist device so that it can provide energy to the boost device to overcome or reduce the initial operational inefficiencies of the boost device and thereby eliminate or reduce so-called "turbo-lag" in low power driving situations.

Other exemplary embodiments and implementations will become apparent from the detailed descriptions provided herein after. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the inventions will become more fully understood from the detailed description and the accompanying drawings, wherein.

DETAILED DESCRIPTION OF EXEMPLARY EMBODIMENTS

The following descriptions of the embodiments are merely exemplary in nature and are in no way intended to limit the invention, its application, or uses.

Figure 1:
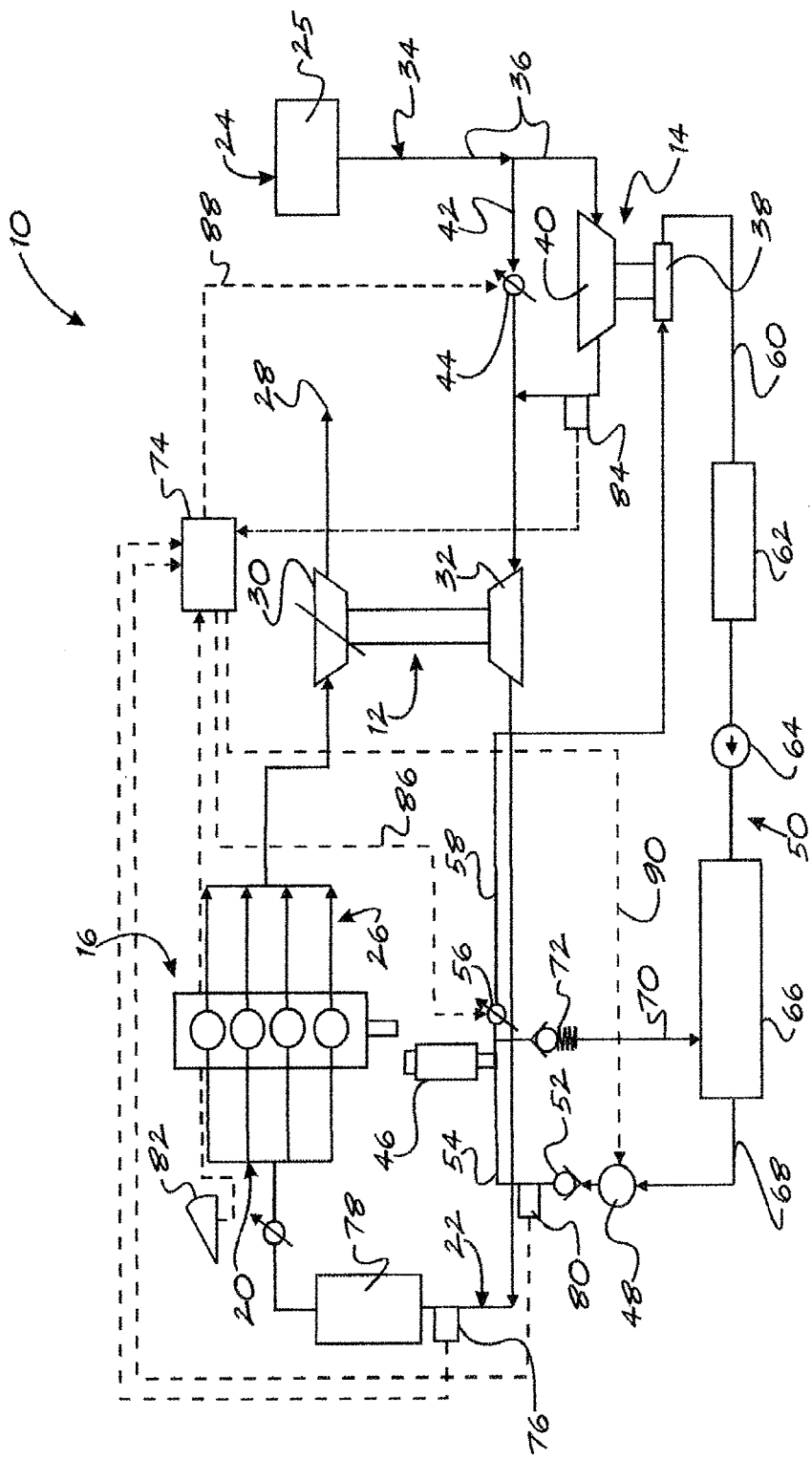
FIG. 1 is a schematic diagram of an engine system including one embodiment of a boost device and a boost assist device.

Referring in more detail to the drawings, FIG. 1 illustrates an engine system 10 that includes a boost device 12 and one exemplary embodiment of a boost assist device 14. The boost device 12 may be a turbocharger or other device and may provide an increased air charge to an engine 16 to improve the engine performance. In one embodiment the boost device 12 includes a compressor that may have a flow rate ranging from 0 to 300 kg/hr. The boost assist device 14 and related engine system components may provide supplemental energy to the boost device 12 in at least certain operating conditions to improve the performance of the boost device 12 and the engine system 10 in general.

The engine system 10 may include an engine 16 such as, but not limited to, a combustion gasoline or diesel engine. An air intake system 20 may include components and devices located upstream of the engine 16. For example, the air intake system 20 may include plumbing 22 connected to the engine 16 at one end and the plumbing may include an open end or inlet 24. As used herein, the term plumbing includes any suitable conduit, tubes, hoses, passages, manifolds, or the like. An optional air filter 25 or cleaner may be provided in the air intake system, and may be located at or near the inlet 24.

An exhaust system 26 may be connected to the engine 16 to exhaust combustion gases out an open end 28 thereof; such as through a catalytic converter, muffler and/or tail pipe. Optionally, a turbocharger 12 may be provided including a turbine 30 and an air compressor 32. The turbine 30 may be constructed and arranged to be driven by exhaust gases discharged from the engine 16 and through the exhaust system 26. The compressor 32 may be operably connected to the turbine 30 and driven by the turbine 30 to deliver compressed air into and through the intake system 20 and to the engine 16.

The air intake system 20 may include an intake line 34 including a first segment 36 that may be disposed and extend between the inlet 24 of the air intake system 20 and the turbocharger compressor 32. The boost assist device 14 may be provided in the first segment 36 and may be constructed and arranged to assist the turbocharger compressor 32 by selectively delivering compressed air through the air intake system 20 and to the compressor 32. The boost assist device 14 may include a drive mechanism 38 to receive any suitable drive power, and a compressor or fan 40 coupled to and driven by the drive mechanism 38. In one embodiment the boost assist device 14 includes a compressor or fan 40 that may have a flow rate ranging from 0 to 300 kg/hr.

A bypass line 42 may be provided to provide a path bypassing the boost assist device 14. In one implementation, the bypass line 42 includes a bypass valve 44 that may be connected in parallel with the boost assist device 14. The bypass valve 44 may be constructed and arranged to fully or partially open and/or close to allow, prevent or meter the flow of air through the bypass line 42. As used herein the term close includes fully closed, and/or partly closed such that the bypass valve 44 is also partly open. Likewise, the term open includes fully open, and/or partly open such that the bypass valve 44 is also partly closed.

A storage device 46 may be provided to store power or energy received from a power device 48. Energy stored in the storage device 46 may be delivered to the drive mechanism 38 of the boost assist device 14 to drive the boost assist device and cause it to deliver energy to the boost device 12 or the boost assist device 14 may deliver energy needed elsewhere in the vehicle such as directly to the engine, which energy may be in the form of compressed air. The storage device 46 may be communicated with the boost assist device 14 to provide energy to the boost assist device as a function of the engine power demand and the potential boost device output or as otherwise needed. If, based in instantaneous engine and boost device operating conditions, the potential instantaneous output of the boost device 12 is low compared to that needed to meet the engine power demand, more energy may be provided to the boost assist device 14 so that it, in turn, provides more energy to the boost device 12. If the potential instantaneous boost device output is higher relative to the engine power demand, less energy may need to be delivered from the storage device 46 to the boost assist device 14, and in turn, to the boost device 12.

In one implementation, the storage device includes an accumulator 46 and the power device includes a fluid pump 48 that is communicated with and draws fluid from an engine oil supply system 50. Of course, a storage device or accumulator 46 may be implemented in other ways, including an electrical charge storage device and the power device may include a battery, fuel cell, alternator, generator or other source of electrical energy, by way of examples without limitation.

A check valve 52 may be provided between the pump 48 and accumulator 46 in a high-pressure fill line 54 to prevent back flow of fluid from the accumulator 46 to the pump 48. A control valve 56 may be disposed between the accumulator 46 and the boost assist device 14 in a high-pressure delivery line 58 to control the delivery of pressurized fluid from the accumulator 46 to the boost assist device 14. Downstream of the boost assist device drive mechanism 38, a drain line 60 may be provided that leads to an engine oil sump 62 that, in turn, is communicated with an engine oil pump 64 and a reservoir 66 of the engine oil supply system 50. In another embodiment, the drain line 60 may lead to an engine oil supply or a separate oil supply, for example but not limited to a separate tank with hydraulic fluid. The reservoir 66 may be communicated with the inlet of the pump 48 through a low-pressure delivery line 68 and with the accumulator 46 through a pressure relief line 70. A check valve 72 may be disposed in the pressure relief line 70 to limit the maximum pressure in the accumulator 46 and permit venting of the accumulator 46 to the reservoir 66.

The engine system 10 may further include a controller 74 or control system constructed and arranged to control or monitor various systems and components in the engine system 10. For example, at sensor 76 the controller 74 may monitor and/or be responsive to the boost pressure provided to an air cooler 78 immediately upstream of the engine 16, at sensor 80 the pressure in the accumulator 46, at sensor 82 the accelerator/throttle position, and at sensor 84 the pressure downstream of the boost assist device compressor 40. The controller 74 may also be responsive to, actuate, or control actuation of various components in the engine system 10 including at 86 the accumulator control valve 56 to control the flow of pressurized fluid from the accumulator 46 into the boost assist device 14, at 88 the bypass valve position, and at 90 actuation and operation of the pump 48 such as by control of power to an electric motor of the pump 48. The controller 74 or control system may be the same as or separate from the controller used to control the engine 16, or a different vehicle controller(s) or control system(s) for one or more other vehicle systems.

The controller 74 selectively actuates the pump 48 under certain operating conditions so that fluid in the accumulator is delivered to the boost assist device 14 so that the boost assist device can provide supplemental hydraulic energy or power for the boost device 12. Because actuating the pump 48 to provide a pressurized fluid charge to the accumulator 46 requires energy and may therefore negatively impact vehicle performance, the controller 74 may selectively actuate the pump 48 in certain operating conditions. For example, the pump 48 may be actuated or controlled as a function of the current engine power and the existing pressure within the accumulator 46. In this manner, the controller 74 may control actuation of the pump 48 in response to a variety of input signals or data collected from sensors and like devices such as those previously set forth herein. The controller 74 may include any suitable processing devices for executing computer readable instructions or the like, and any suitable memory device(s) coupled to the processing device(s) for storing data and computer readable instructions. The controller 74 may control the pump 48 based on information obtained that is representative of the engine load. This information may be directly measured or calculated or estimated from the fuel being commanded to the fuel injectors from the engine controller, from the throttle position, boost or MAP sensors, or a turbocharger compressor speed or from any other variety of actuator command signals (e.g. fueling, VTG, etc.)

The target value of energy storage in the storage device (e.g. accumulator 46) may be determined as a function of the supplemental energy needed by the boost device 12 to reduce or eliminate a lag in its output to the engine 16. This supplemental energy is delivered from the boost assist device 14 to the boost device 12. In at least certain vehicle applications, the required maximum duration of energy delivery to the boost assist device turbine 38 may be less than two seconds. Of course, this will vary according to the specific engine/vehicle application and can be determined by appropriate simulation and/or testing. In any event, the pump 48 can be sized to charge the accumulator 46 to a desired target level or above in a relatively brief time interval, if desired. For example, in at least one implementation, this time interval may be less than about fifteen seconds, and may desirably be between two and ten seconds.

Figure 2:
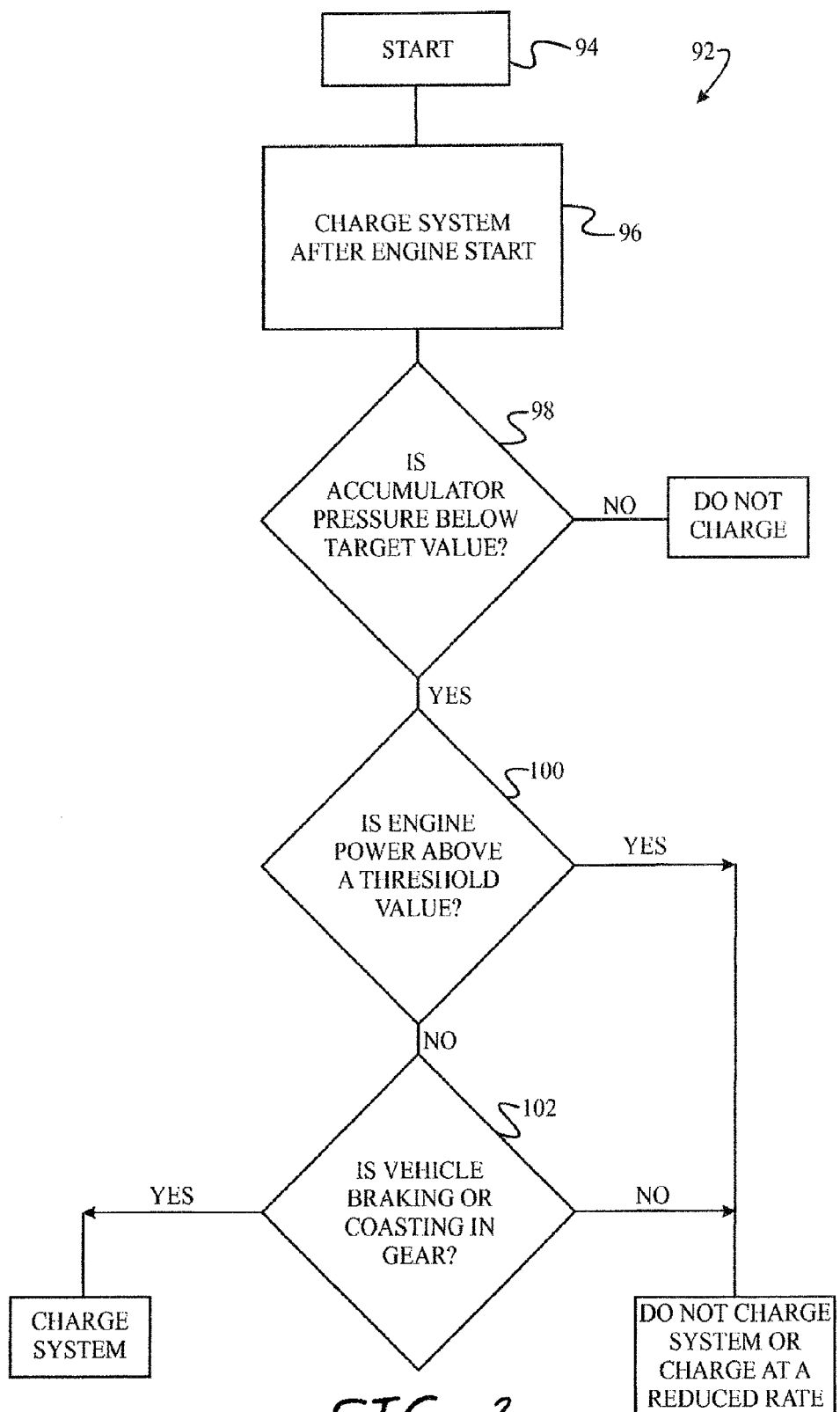
FIG. 2 is a logical flow chart illustrating a method of operating one embodiment of an engine system.

A method 92 of operating the engine system 10 is shown in FIG. 2 and begins at a start point 94. In step 96, when the engine 16 reaches idle speed after it has started, the controller 74 may actuate the pump 48 to charge the accumulator 46 until the target pressure is reached. Thereafter, during normal driving, whenever the pressure in the accumulator 46 drops below its target value and the engine power is above a threshold value, as shown in steps 98 and 100, a decision may be made to not actuate the pump 48 and not refill or further charge the accumulator 46. In at least some applications, this may be acceptable because little or no hydraulic boost assist may be required above a certain engine power level, and there is a minimum period of time before the boost device 12 (e.g. turbocharger) will slow down enough to require any boost assist. This will improve fuel-efficiency because the vehicle alternator load will not be increased during vehicle acceleration or high power driving situations. Further, in step 102, whenever the controller 74 senses that the throttle is closed such that the vehicle is either coasting in gear or braking in gear, the pump 48 will be actuated until the target pressure in the accumulator 46 is reached. The pump 48 may be actuated even if the pressure in the accumulator 46 is above its target value to take advantage of desirable charging conditions when engine power is not demanded by the driver.

Finally, during normal driving, whenever the pressure in the accumulator 46 is below its target value (as determined in step 98) and the engine power is below a threshold value (as determined in step 100), the pump 48 may charge the accumulator 46 at least to the target pressure. This will ensure that when additional power is demanded by the driver, the necessary pressure can be provided from the accumulator 46 to the boost assist device 14 to eliminate or reduce lag in the turbocharger 12 during low power driving situations.

Figure 3:
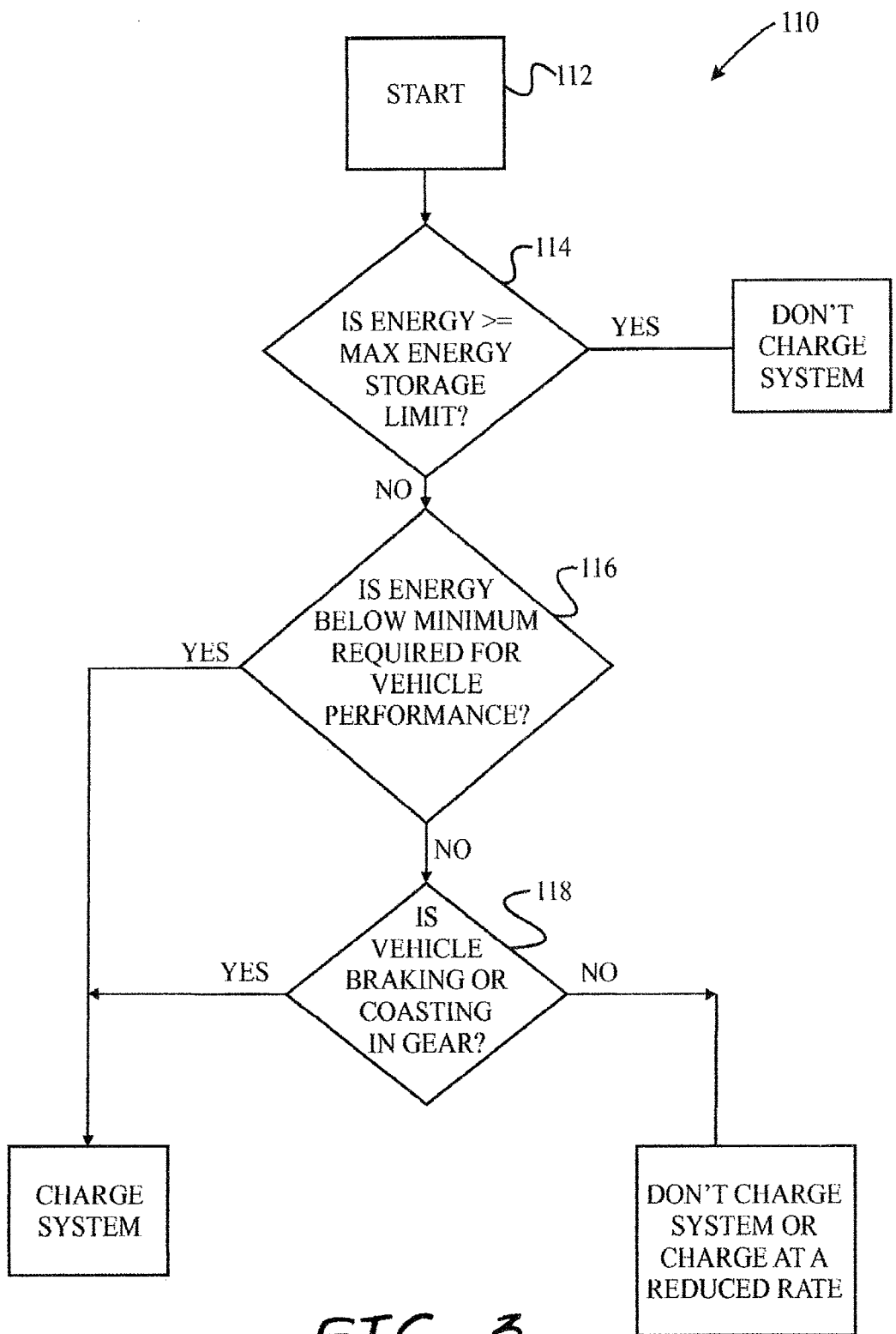
FIG. 3 is a logical flow chart illustrating a method of operating an embodiment of an engine system.

Referring now to FIG. 3, a method 110 for controlling the pump 48 and charging the accumulator 46 may be provided. The method 110 may include a start point 112 and a step 114 may include determining whether the energy stored in the accumulator 46 is greater than or equal to a threshold or maximum energy storage limit. If it is, the accumulator 46 should not be charged, since doing so would further increase the pressure in the accumulator 46 which may be unnecessary for system operation and hence, a waste of energy, and may in any event simply cause the accumulator 46 to be vented to the reservoir 66 through the check valve 72 and thereby waste energy.

A step 116 may include determining energy status of the accumulator (e.g. whether the energy stored in the accumulator 46 is below a target value or a minimum value required for desired vehicle performance). If the power level or energy in the accumulator is below the target value, then the pump 48 may be actuated by the controller 74 to provide a pressurized fluid charge to the accumulator 46. If it is not, then a step 118 may include determining whether the vehicle is braking or coasting in gear such that energy may be diverted from the engine 16 to charge the accumulator 46 without interfering or inhibiting the engine performance. Accordingly, in such circumstances, when the accumulator energy level is below the maximum energy storage limit or threshold it may be desirable to store additional energy in the accumulator 46. Indeed, during vehicle braking, the energy required to charge the accumulator 46 could come entirely from energy that would otherwise be wasted in the heat of braking. In this manner, the energy used to charge the system (e.g. accumulator) may come without any engine performance loss. If the vehicle is not braking or coasting in gear, then a decision may be made to not charge the system, as noted in FIG. 3. So, on average, charging the accumulator 46 during vehicle coasting may be better than charging during powered vehicle driving, but not as good as charging the system during vehicle braking.

Figure 4:
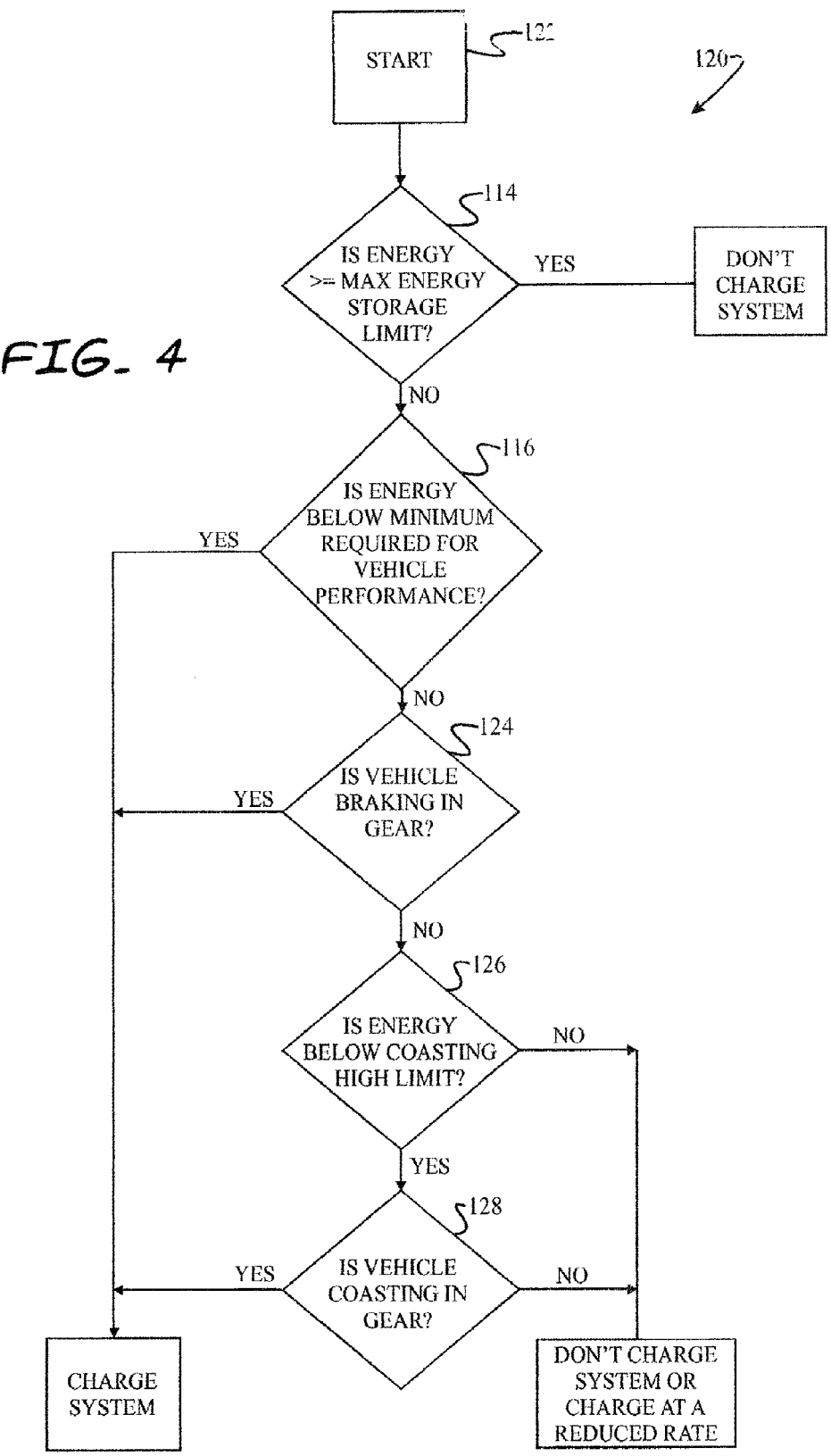
FIG. 4 is a logical flow chart illustrating a method of operating another embodiment of an engine system.

As shown in the method 120 of FIG. 4, more than one level of charging may be defined. The method 120 begins at a start point 122 and may include the same steps 114, 116 as set forth with regard to the method 110 of FIG. 3. A step 124 may include determining if the vehicle is braking and in gear. If yes, then a first level of charging of the accumulator 46 may be implemented. If the vehicle is not braking in gear, a step 126 may include determining whether the energy level in the accumulator 46 is below a second threshold or a coasting high limit. If the energy level in the accumulator 46 is above the second threshold, then a decision may be made not to charge the accumulator 46. If the energy is below the second threshold, then in step 128 a determination may be made whether the vehicle is coasting in gear. If it is, then the accumulator 46 may be charged at least to the second threshold and if not, then the accumulator 46 is not charged.

In this manner, a first level or higher level of energy storage or accumulator charging may be undertaken during vehicle braking and thereby use energy that would otherwise be lost in the act of braking. A second or lower level of energy storage or accumulator charging may be used when the vehicle is coasting to avoid or reduce undesirable parasitic energy loss from the engine 16 due to charging the accumulator 46. This may be desirable because charging the accumulator 46 during coasting of the vehicle may undesirably slow the vehicle. It should be recognized that, in some instances, the driver's intention may be to slow down as the vehicle is coasting. In that situation, the parasitic energy loss required to charge the system may be desirable to the driver.

Accordingly, in at least one implementation, the controller 74 will ensure that the minimum energy required so that the boost assist device 14 can adequately assist the boost device 12 is always stored in the accumulator 46. And when free energy is available, such as during at least certain vehicle operating conditions (for example, during vehicle braking), the controller 74 will attempt to store additional energy. In one implementation, the controller 74 will actuate the pump 48 to charge the accumulator 46 when the energy status of the storage device is below a target value regardless of the vehicle operating state and hence regardless of the energy penalty. This ensures that the boost assist device 14 is ready to provide energy the boost device 12 when needed. Once the energy storage is above some minimum target value, the controller 74 might be arranged to charge the accumulator 46 only when the vehicle is not drawing power from the engine 16. The controller 74 may continue this charging strategy and operation until the accumulator 46 or other storage device reaches its maximum allowable energy storage capacity or a maximum threshold. Further, because the additional energy for the boost assist device 14 may come from free energy such as energy that would otherwise be lost in the act of braking, the engine system 10 may actually reduce the total engine energy usage under at least some operating conditions.

The above description of engine system and method embodiments is merely exemplary in nature, and, thus, variations thereof are not to be regarded as a departure from the spirit and scope of the invention. For example, while some embodiments discussed herein included an accumulator to store pressurized fluid, any energy storage device could be used. Such energy storage devices may store an electrical charge for delivery of electrical energy to the boost device. In such an embodiment, the accumulator and pump may be replaced with a battery, capacitor and alternator, generator or other source of electrical energy creation and storage. Still further, the pump may comprise an existing vehicle pump such as a transmission fluid pump. If desired or necessary, a valve could be controlled to establish a priority of fluid flow to ensure, in one example, that the vehicle transmission is first provided with its pressurized fluid needs before fluid is diverted to the accumulator or other storage device. The fluid provided could also comprise other existing vehicle fluids like diesel fuel from a vehicle fuel system. In that example, the pump may be an existing fuel pump, or an additional pump added to the engine system. A priority or control valve may also be employed to ensure that the fuel demand of the engine is first met, and/or to selectively control the actuation of the boost assist device 14.

What is claimed is:

1. A method, comprising:
selectively actuating a power device to provide energy to a storage device as a function of at least one of the current energy status of the storage device or a condition of engine or vehicle operation; wherein selectively actuating the power device is accomplished when the energy status of the storage device is below a maximum threshold and a vehicle associated with the engine is not actively drawing power from the engine; and
selectively providing energy from the storage device to a boost assist device that is communicated with a boost device in at least certain engine or vehicle operating conditions to enable an increased output of the boost device, wherein the boost assist device comprises a drive mechanism and at least one of a compressor or fan coupled to the drive mechanism, the energy provided from the boost assist device to the boost device being supplemental to a normal energy supply to the boost device;
determining if the vehicle is in gear and braking and providing energy to the storage device if the vehicle is in gear and braking;
determining if the energy status of the storage device is below a second threshold at least when the vehicle is in gear and not braking; and
providing energy to the storage device when the vehicle is coasting, the energy status of the storage device is below the second threshold and the vehicle is not braking.

2. The method of claim 1 wherein the power device is a source of electrical energy and the storage device is capable of storing an electrical charge.

3. The method of claim 1 wherein the power device is a fluid pump and the storage device is capable of storing fluid under pressure.

4. The method of claim 1 wherein selectively actuating the power device is accomplished when the energy status of the storage device is below a maximum threshold and a vehicle associated with the engine is braking.

5. The method of claim 1 wherein a first level of energy is provided to the storage device when the vehicle is coasting and a second level of energy is provided to the storage device when the vehicle is braking.

6. The method of claim 5 wherein the second level of energy is higher than the first level of energy.

7. A system for an engine, comprising:
a boost device having an output that is delivered to the engine to support operation of the engine;
a boost assist device communicated with the boost device to provide supplemental power to the boost device, wherein the boost assist device comprises a drive mechanism and at least one of a compressor or fan coupled to the drive mechanism;
a storage device constructed and arranged to store energy and selectively communicated with the boost assist device to provide energy to the boost assist device, wherein the storage device includes an accumulator; and
a power device communicated with the accumulator and actuated to deliver energy to the storage device wherein energy stored by the accumulator includes pressurized fluid, and the power device includes a pump that provides pressurized fluid to the accumulator wherein the pump has an output sufficient to provide fluid in the accumulator at a pressure at least equal to the target value after less than 15 seconds of actuation of the pump.

8. The system of claim 7 wherein the pump has an output sufficient to provide fluid in the accumulator at a pressure at least equal to the target value after between 1 and 10 seconds of actuation of the pump.

9. The system of claim 7 wherein the pump is driven by an electric motor.

10. The system of claim 7 wherein the boost device is a hydraulically assisted turbocharger.

11. The system of claim 7 wherein the boost device is a hydraulically powered compressor.

12. The system of claim 7 wherein the storage device is communicated with the boost assist device to provide energy to the boost assist device as a function of the engine power demand and the potential boost device output.

13. The system of claim 7 wherein the pump also supplies fluid to a transmission associated with the engine.

14. The system of claim 13 which also includes a valve between the pump and the accumulator to control fluid flow between them.

15. The system of claim 13 wherein the position of the valve is controlled to permit fluid flow to the accumulator when the transmission fluid pressure is above a target for the instantaneous transmission operation.

16. The system of claim 7 wherein the pressurized fluid is diesel fuel from a fuel system associated with the engine.

17. The system of claim 16 wherein the pump also supplies diesel fuel to the engine to support operation of the engine.

18. The system of claim 7 wherein the pump also supplies fluid to a power steering system associated with the engine.

19. The system of claim 18 which also includes a valve between the pump and the accumulator to control fluid flow between them.

20. The system of claim 18 wherein the position of the valve is controlled to permit fluid flow to the accumulator when the power steering fluid pressure is above a target for the instantaneous power steering operation.

21. The system of claim 7 which also comprises a controller to selectively actuate the power device whereupon in at least certain operating conditions energy in the storage device is delivered to the boost assist device to provide supplemental energy to the boost device.

22. The system of claim 7 which also comprises a controller and wherein the controller is responsive to the pressure of fluid in the accumulator and, in at least some operating conditions of the engine, the controller actuates the pump to deliver fluid to the accumulator when the pressure in the accumulator is below a target value.

23. The system of claim 22 wherein the target value is determined as a function of the energy needed by the boost device to reduce or eliminate a lag in its output to the engine.

24. The system of claim 21 wherein the controller is responsive to at least one condition of engine or vehicle operation and actuates the power device to enable or cause the delivery of energy to the storage device as a function of said at least one condition of engine or vehicle operation.

25. The system of claim 24 wherein said at least one condition of engine or vehicle operation includes engine power and the controller actuates the power device when engine power is below a threshold.

26. The system of claim 22 wherein the controller is also responsive to engine power and actuates the pump to deliver fluid to the accumulator when the pressure in the accumulator is below the target value and the engine power is below a threshold.

27. The system of claim 26 wherein the controller does not actuate the pump when the pressure in the accumulator is below the target value if the engine power is above the threshold.

28. A method, comprising:
selectively providing energy to a storage device as a function of at least one of the current energy status of the storage device or a condition of engine or vehicle operation; and
selectively providing energy from the storage device to a boost assist device that is communicated with a boost device in at least certain engine or vehicle operating conditions to enable an increased output of the boost device, wherein the boost assist device comprises a drive mechanism and at least one of a compressor or fan coupled to the drive mechanism, the energy provided from the boost assist device to the boost device being supplemental to a normal energy supply to the boost device and includes a power device including a fluid pump and the storage device is capable of storing fluid under pressure; wherein the power device is selectively actuated, in at least some operating conditions of the engine, when the energy status of the storage device is below a target value; wherein selectively actuating the power device is accomplished when the energy status of the storage device is above the target value but below a maximum threshold, and a vehicle associated with the engine is not actively drawing power from the engine; and
determining if the vehicle is in gear and braking and providing energy to the storage device if the vehicle is in gear and braking; and
determining if the energy status of the storage device is below a second threshold at least when the vehicle is in gear and not braking; and
providing energy to the storage device when the vehicle is coasting, the energy status of the storage device is below the second threshold and the vehicle is not braking.

29. The method of claim 28 wherein the energy provided to the storage device is electrical energy and the storage device is capable of storing an electrical charge.

30. The method of claim 28 wherein selectively actuating the power device is accomplished when the energy status is below the target value and the engine power is below a threshold.

31. The method of claim 28 wherein selectively actuating the power device is accomplished whenever the energy status of the storage device is below a target value.

32. The method of claim 28 wherein energy is provided to the storage device when the energy status of the storage device is below a maximum threshold and a vehicle associated with the engine is not actively drawing power from the engine.

33. The method of claim 28 wherein energy is provided to the storage device when a vehicle associated with the engine is braking, and the energy provided to the storage device includes energy that would have otherwise been lost in the act of braking the vehicle.

34. The method of claim 32 wherein a first level of energy is provided to the storage device when the vehicle is coasting and a second level of energy is provided to the storage device when the vehicle is braking.

35. The method of claim 34 wherein the second level of energy is higher than the first level of energy.

36. A method, comprising:
selectively actuating a power device to provide energy to a storage device as a function of at least one of the current energy status of the storage device or a condition of engine or vehicle operation;
selectively providing energy from the storage device to a boost assist device that is communicated with a boost device in at least certain engine or vehicle operating conditions to enable an increased output of the boost device, the energy provided from the boost assist device to the boost device being supplemental to the a normal energy supply to the boost device;
wherein selectively actuating the power device is accomplished when the energy status of the storage device is below a maximum threshold and a vehicle associated with the engine is not actively drawing power from the engine; and
determining if the vehicle is in gear and braking and providing energy to the storage device if the vehicle is in gear and braking;
determining if the energy status of the storage device is below a second threshold at least when the vehicle is in gear and not braking; and
providing energy to the storage device when the vehicle is coasting, the energy status of the storage device is below the second threshold and the vehicle is not braking.

37. A system for an engine, comprising:
a boost device having an output that is delivered to the engine to support operation of the engine;
a boost assist device communicated with the boost device to provide supplemental power to the boost device;
a storage device constructed and arranged to store energy and selectively communicated with the boost assist device to provide energy to the boost assist device, wherein the storage device includes an accumulator;
a power device communicated with the accumulator and actuated to deliver energy to the storage device;
wherein energy stored by the accumulator includes pressurized fluid, and the power device includes a pump that provides pressurized fluid to the accumulator; and
wherein the pump has an output sufficient to provide fluid in the accumulator at a pressure at least equal to the target value after less than 15 seconds of actuation of the pump.

38. The system of claim 37 wherein the pump has an output sufficient to provide fluid in the accumulator at a pressure at least equal to the target value after between 1 and 10 seconds of actuation of the pump.

39. A method, comprising:
selectively providing energy to a storage device as a function of at least one of a current energy status of the storage device or a condition of engine or vehicle operation;
selectively providing energy from the storage device to a boost assist device that is communicated with a boost device in at least certain engine or vehicle operating conditions to enable an increased output of the boost device, the energy provided from the boost assist device to the boost device being supplemental to a normal energy supply to the boost device;
a power device including a fluid pump and wherein the storage device is capable of storing fluid under pressure;
wherein the power device is selectively actuated, in at least some operating conditions of the engine, when the energy status of the storage device is below a target value;
wherein selectively actuating the power device is accomplished when the energy status of the storage device is above the target value but below a maximum threshold, and a vehicle associated with the engine is not actively drawing power from the engine; and determining if the vehicle is in gear and braking and providing energy to the storage device if the vehicle is in gear and braking;

determining if the energy status of the storage device is below a second threshold at least when the vehicle is in gear and not braking; and providing energy to the storage device when the vehicle is coasting, the energy status of the storage device is below the second threshold and the vehicle is not braking.

\* \* \* \* \*